(12) United States Patent
Cackley et al.

(10) Patent No.: US 12,485,811 B2
(45) Date of Patent: Dec. 2, 2025

(54) INTEGRATED WEAR BAR

(71) Applicant: Jaeger-Unitek Sealing Solutions, Inc., LaPorte, IN (US)

(72) Inventors: Jason Cackley, South Bend, IN (US); Scott Koppen, Wanatah, IN (US); Leon Bogucki, Rolling Prairie, IN (US); Makoto Sato, Michigan City, IN (US)

(73) Assignee: Jaeger-Unitek Sealing Solutions, Inc., LaPorte, IN (US)

( * ) Notice: Subject to any disclaimer, the term of this patent is extended or adjusted under 35 U.S.C. 154(b) by 378 days.

(21) Appl. No.: 18/197,834

(22) Filed: May 16, 2023

(65) Prior Publication Data

US 2023/0366432 A1 Nov. 16, 2023

Related U.S. Application Data

(60) Provisional application No. 63/342,293, filed on May 16, 2022.

(51) Int. Cl.
*B60P 3/34* (2006.01)

(52) U.S. Cl.
CPC ....................... *B60P 3/34* (2013.01)

(58) Field of Classification Search
CPC .......................................... B60P 3/34
See application file for complete search history.

(56) References Cited

U.S. PATENT DOCUMENTS

| | | | |
|---|---|---|---|
| 6,802,555 B2 | 10/2004 | Yoder et al. | |
| 7,229,123 B2 | 6/2007 | Kunz | |
| 9,505,357 B2 | 11/2016 | Ksiezopolski | |
| 9,533,629 B2 | 1/2017 | Ksiezopolski et al. | |
| 9,796,321 B2 | 10/2017 | Ksiezopolski et al. | |
| 10,480,627 B1 | 11/2019 | Vroom | |
| 10,501,026 B2 * | 12/2019 | Ksiezopolski | .......... B60R 13/06 |
| 10,703,249 B2 | 7/2020 | Angelow | |
| 10,927,929 B2 | 2/2021 | Vroom | |
| 10,967,777 B2 | 4/2021 | Howie et al. | |
| 11,034,279 B2 | 6/2021 | VanOrt et al. | |
| D1,057,207 S * | 1/2025 | Kamp | .......... D25/119 |
| 2007/0096505 A1 * | 5/2007 | Haack | .......... B62D 33/046 |
| | | | 52/270 |
| 2020/0062164 A1 | 2/2020 | Garceau | |
| 2020/0317143 A1 | 10/2020 | Goode | |
| 2021/0253017 A1 | 8/2021 | Wieth | |

* cited by examiner

*Primary Examiner* — Faye M Fleming
(74) *Attorney, Agent, or Firm* — Vedder Price P.C.

(57) ABSTRACT

The integrated wear bar comprises a base, an archway including an incline and decline, and ribs cooperatively formed to work as a ramp. The ribs act as reinforcing load bearing members when the slide out floor is advanced up and over the sub floor. The archway assists with the retraction and closing of the slide out room by elevating the slide out room up and over the sub floor. Finally, the base portion of the integrated wear bar provides a path for the slide out room to move along during retraction and closing of the slide out room.

12 Claims, 11 Drawing Sheets

INTEGRATED WEAR BAR

CROSS-REFERENCE TO OTHER APPLICATION

This application claims the benefit of and priority to U.S. Provisional Application No. 63/342,293 filed May 16, 2022, the content of which is hereby incorporated by reference.

FIELD OF THE DISCLOSURE

The present disclosure generally relates to the field of recreational vehicles. More particularly, the disclosure is dedicated to a device to assist with the retraction and closing of the slide out room of a recreational vehicle.

BACKGROUND OF THE INVENTION

Slide out rooms are a common feature in recreational vehicles ("RV"). A slide-out room is typically housed in the main body of an RV, but has the capability to "slide out" from the body of the RV to create a new room or compartment adjacent to the living area of the RV. However, slide out rooms must be able to effectively retract or close. In some instances slide out rooms include a ramp apparatus which guides a slide out room between an extended position (wherein the slide out room is flush with the floor of the RV) and a closed or retracted position (wherein the slide out room is stored above the floor, or sub floor, of the RV).

Generally, it is desired that slide out rooms are constructed such that the floor of the slide out room system is flush with the floor inside the RV when the slide out room is extended.

The process of extending and retracting the slide out room requires an apparatus to guide the slide out room between extended and retracted positions. Slide out floors typically use a sloped edge as a mechanism to climb up and over a sub floor in order to close. To prevent wear and tear and to increase the ease of operation slide out room systems may include flashing covers which guide the slide out room along a path or include a plastic wear bar to facilitate the ramp function.

However, the current models of retractable RV slide out rooms use mechanisms which generally consist of multiple separate devices. In particular, the base/bottom of the slide out room is typically sloped in part, with a portion of the base/bottom running another portion running at an angle (less than 90 degrees) from the floor. The sloped portion is meant to provide a means for the slide out room to elevate up and on top of a sub floor as the force of the slide out room is applied to the sub floor. Current models often include a metallic flashing cover, which acts as a guide or rail for the base of the slide out room to move along. In some models, the flashing cover runs along the entirety of the floor, frame, or support of an RV as well as the side and top portions of the sub floor. Even with the flashing cover, which provides the slide out floor with a smooth surface to travel along, the path of movement can be difficult. Therefore, some models include a wear bar which acts as a ramp for the base of the slide out room to move up and over the sub floor. However, on its own, the wear bar can unintentionally shift, break, and be difficult to manage during use as it is not connected to the flashing cover itself.

In particular, current models require high labor costs for lesser quality wear bars and lack the requisite uniformity across the entire length of the wear bar to adequately support weight distribution of the slide out room. In addition, current models have high material costs, fail to provide visual indicia to position fasteners, and do not match the specifications of the Flip 'N Seal™ Bottom Pan.

There exists a need in the marketplace, therefore, for a solution that provides an easy to use, sturdy, flexible, and long lasting apparatus capable of extending and retracting a slide out room located on a recreational vehicle.

SUMMARY OF THE INVENTION

A wear bar provides support for a slide out room while traveling between two positions. The integrated wear bar combines a flashing cover and wear bar into one component and facilitates the slide out floor's extension and retraction over the floor or sub-floor of an RV (hereafter "sub floor"). The integrated wear bar comprises a base, an archway including an incline and decline, and ribs cooperatively formed to work as a ramp. The ribs act as reinforcing load bearing members when the slide out floor is advanced up and over the sub floor. The archway assists with the extension and retraction of the slide out room by elevating the slide out room up and over the sub floor. Finally, the base portion of the integrated wear bar provides a path for the slide out room to move along during retraction and closing of the slide out room.

In an embodiment the integrated wear bar includes a recessed channel along one side of the archway. The recessed channel enables the installer to fasten in various locations directly to the sub floor, providing tremendous flexibility for securing the new component and decreasing installation time.

In one advantage of the present disclosure both the floor portion and the archway are integrated into a single part. In a second advantage of the present disclosure, the integrated wear bar features a ribbed geometry which, in combination with the consolidation of the floor and archway, increase the load bearing capability for the specific invention. In a third advantage of the present disclosure, the integrated wear bar includes a recessed channel which allows an installer to fasten the wear bar directly to the sub floor, providing flexibility in securing the new component, decreasing installation time, and improving repeatability of fastening operations.

DETAILED DESCRIPTION OF THE DISCLOSURE

Figure 1:
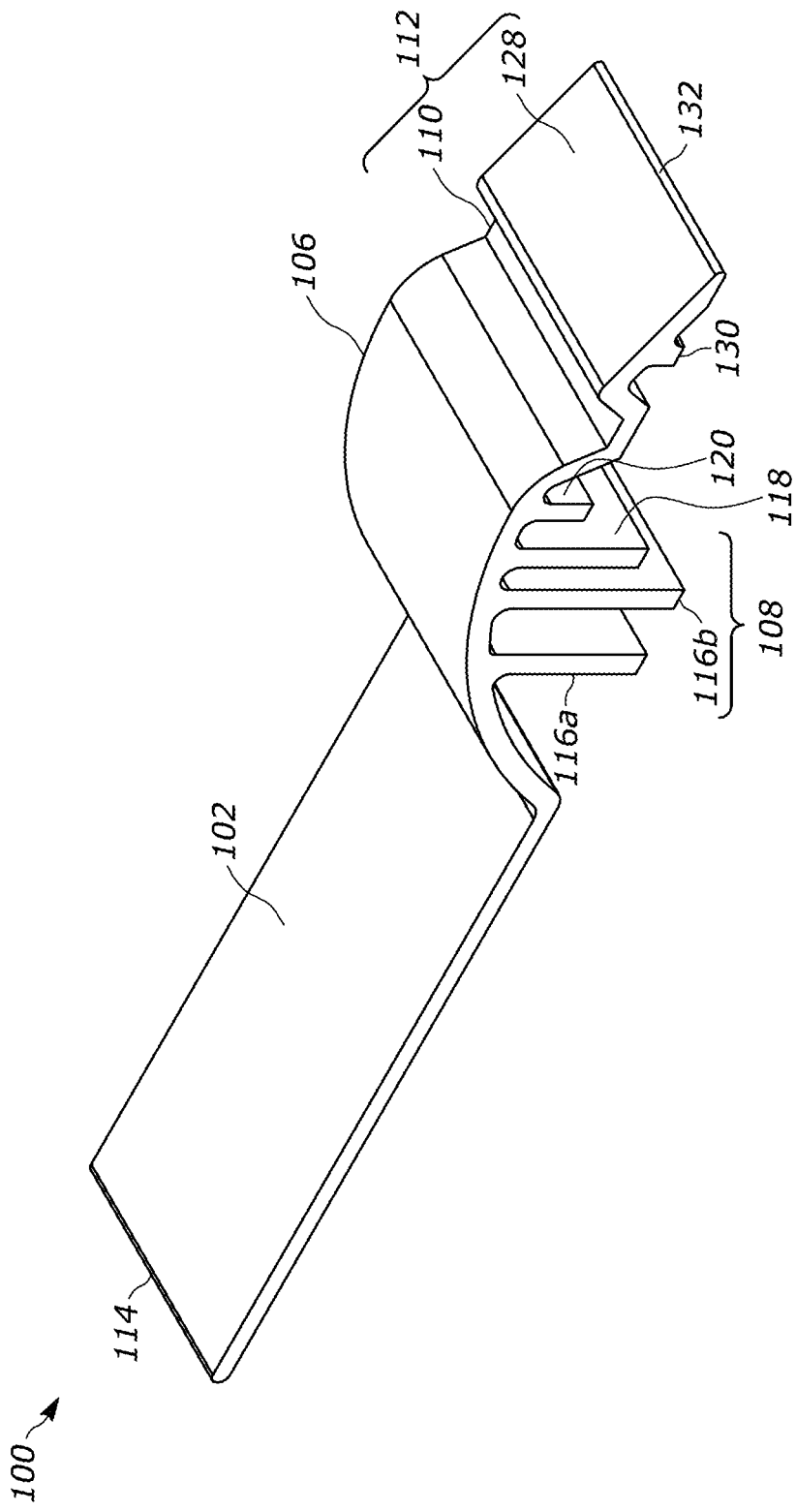
FIG. 1 is a perspective view of the integrated wear bar in accordance with a first embodiment of the present disclosure.
Figure 2:
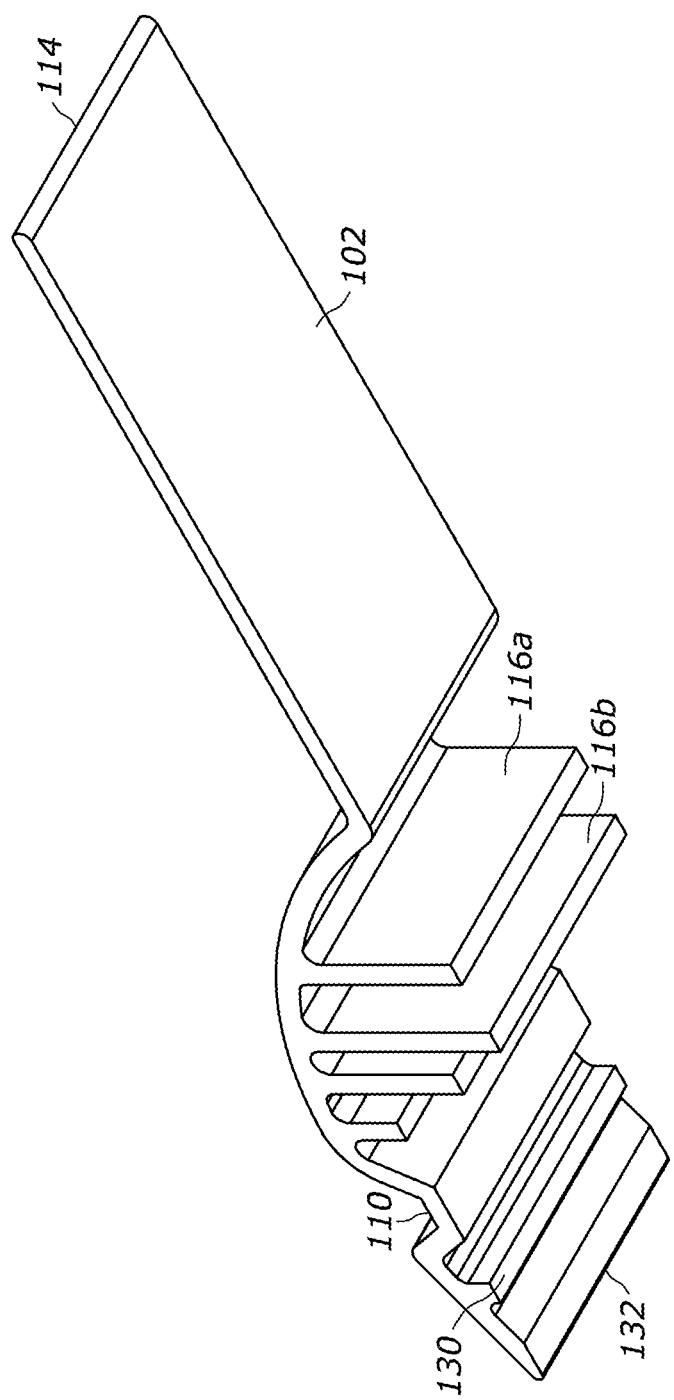
FIG. 2 is a second perspective view of the integrated wear bar of FIG. 1 wherein the wear bar is shown from the underside position according to an embodiment of the present disclosure.
Figure 3:
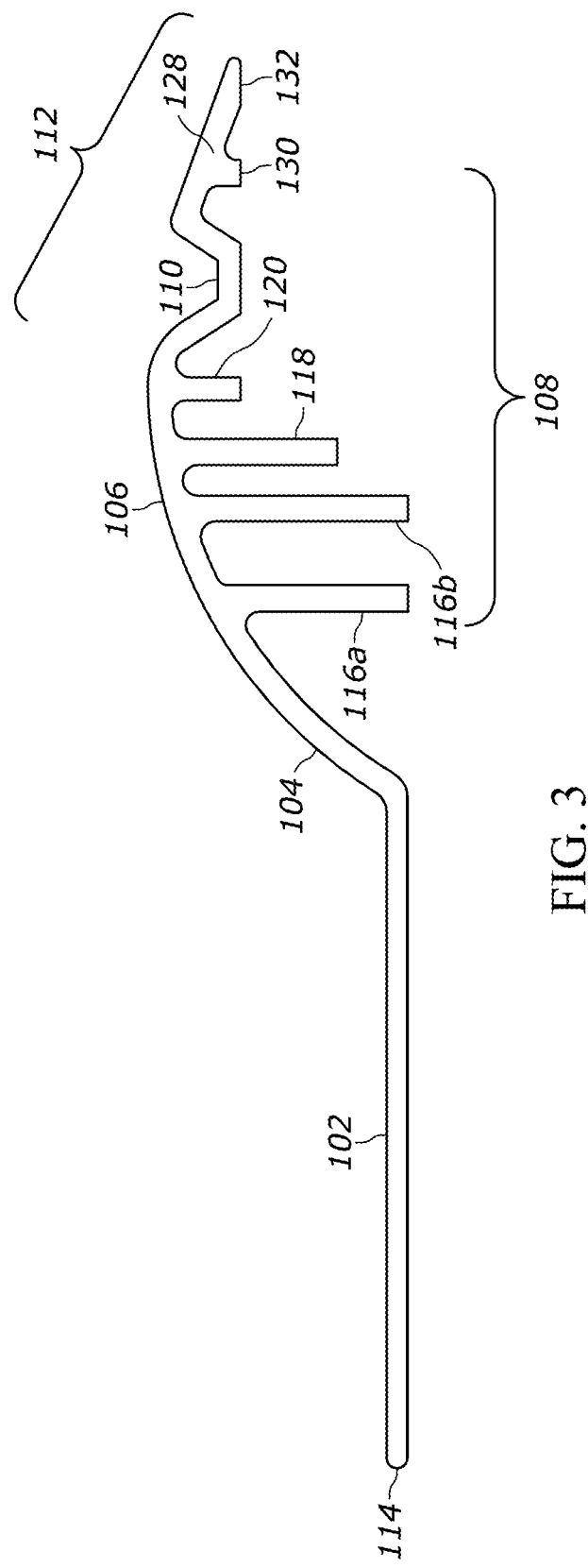
FIG. 3 is a side view of the integrated wear bar of FIG. 1.
Figure 4:
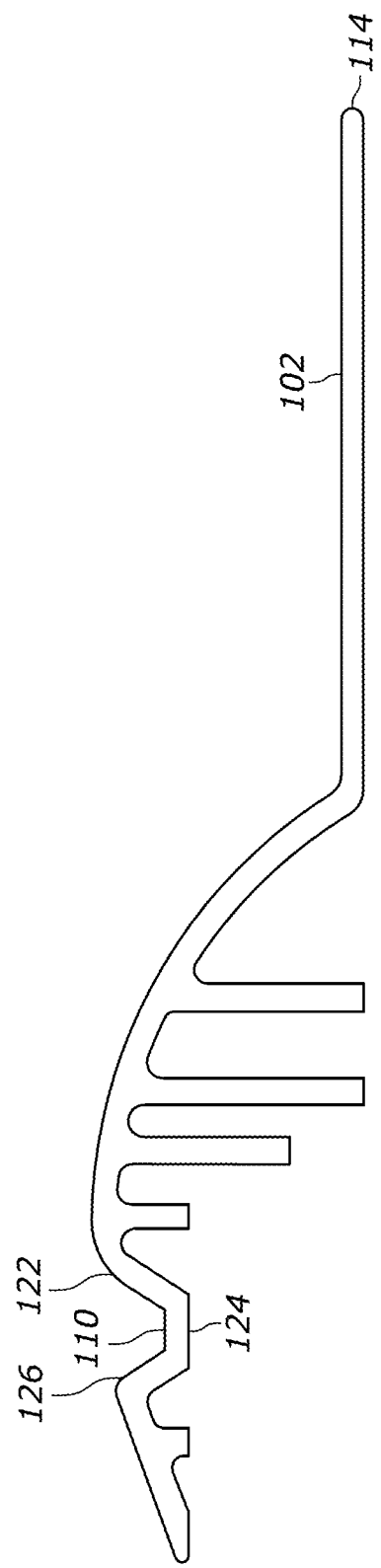
FIG. 4 is a second side view of the integrated wear bar of FIG. 1.
Figure 6:
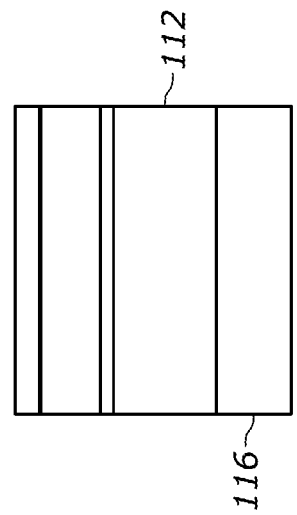
FIG. 6 is a rear view of the integrated wear bar of FIG. 1.
Figure 5:
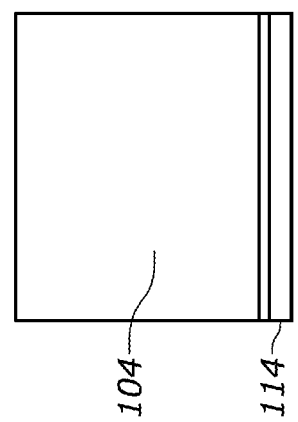
FIG. 5 is a front view of the integrated wear bar of FIG. 1.
Figure 7:
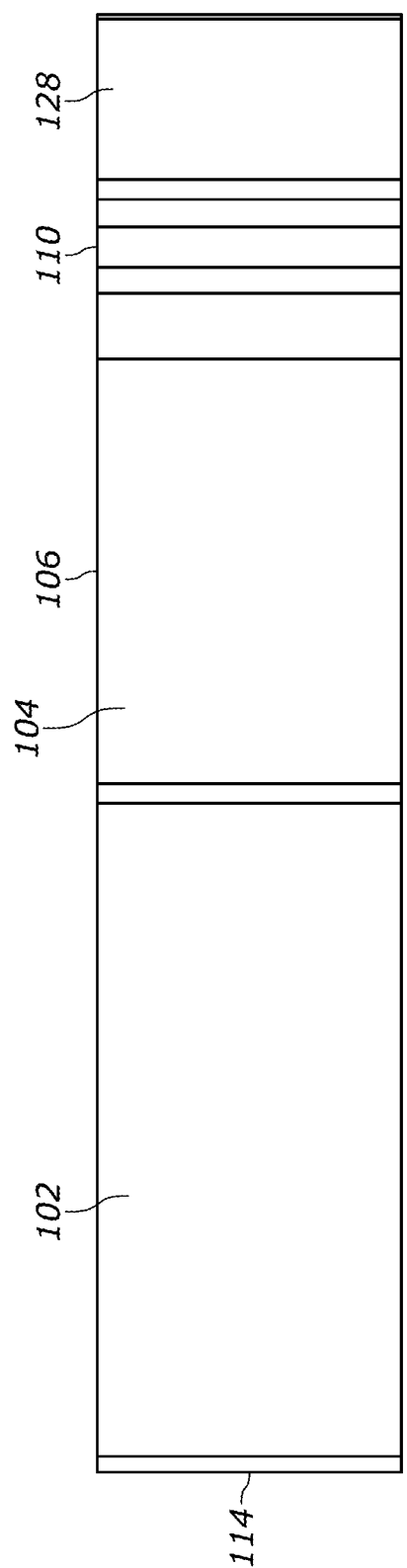
FIG. 7 is a top view of the integrated wear bar of FIG. 1.
Figure 8:
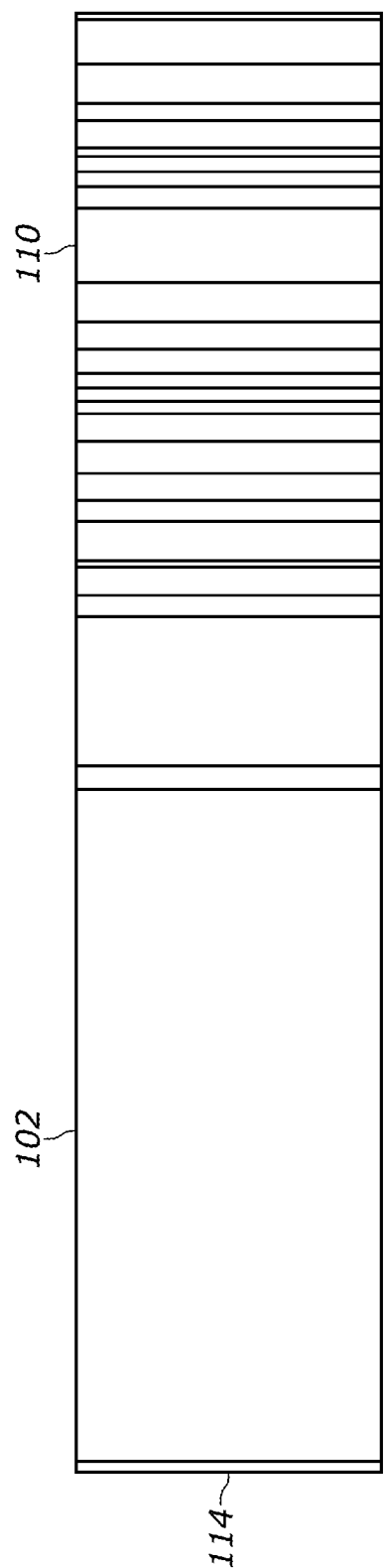
FIG. 8 is a bottom view of the integrated wear bar of FIG. 1.

FIGS. 1-8 and 12 show a first embodiment of an integrated wear bar 100 in accordance with the present disclosure. The integrated wear bar 100 combines the functionality of a plastic wear bar and a metallic flashing cover into a single piece. The consolidated design allows the wear bar 100 to be "flush" with the floor inside the RV. The integrated wear bar 100 is particularly useful in retracting or closing slide out rooms 402 used in RVs. The integrated wear bar 100 comprises a base 102, an upward ramp 104, an archway 106, a series of ribs 108, a recessed channel 110, and a downward ramp 112.

In the embodiment shown in FIGS. 1-8, and 12, the integrated wear bar 100 is installed in an RV slide out room system. The integrated wear bar 100 itself provides a smooth and reusable path for the slide out room 402 to retract and close.

The integrated wear bar 100 is comprised of a length, width, and thickness. The wear bar may be completely solid or partially hollow. In an embodiment, the hollow portion may comprise filler materials including but not limited to thermoplastics, metal, wood, and the similarly situated materials.

In an embodiment, the integrated wear bar 100 comprises a thickness of 0.08 inches and a length of 5.67 inches from end to end. In an alternative embodiment, the integrated wear bar 100 comprises a length of 4.17 inches from end to end. In a second alternative embodiment, the integrated wear bar 100 comprises a length of 5.36 inches from end to end.

In the embodiment of FIGS. 1-8, and 12 the base 102 is comprised of a length, width, and thickness of material sized to guide the movement of a slide out room 402. The base 102 is generally flat comprising a top surface and a bottom surface. The top and bottom surfaces of the base 102 are bound by a first end 114 and a second end. The first end 114 is open and the second end is connected to an upward ramp 104. The base 102 is generally flat and provides a smooth surface for the slide out base to move along. The base 102 is installed on a frame, support, or another floor of the RV (hereafter "frame" 404).

In an alternative embodiment, the portion of the wear bar 100 proximate the first end 114 of the base 102 allows for the attachment of other trailer components, such as a sealing system or additional support structures known in the art.

In an embodiment, the base 102 is comprised of a plastic, plastic resin, metal (including but not limited to steel and aluminum), metal alloy, composite, wood, PVC, or combination thereof or other similarly situated materials. In an alternative embodiment, the base 102 is comprised of TPE 40D, TPE 65-75D, PP80-85R Rockwell, or PP Shore D 70-75 or a combination therewith.

In an alternative embodiment, the base 102 comprises a length and width to support the size of the slide out room 402, and a thickness of 0.08 inches.

Historically, wear bars and flashing covers were used as separate components to guide RV slide out rooms 402 between extended and retracted positions. As an example, historically, a flashing cover (usually metallic in nature) was placed beneath and provided support for the bottom of the slide out room 402 and extended to the base of the sub floor 406, along the side of the sub floor 406, and along a portion of the top of the sub floor 406. In a historical embodiment, a user inserted a wear bar (generally plastic in nature) close to the edge of the sub floor 406 in order to provide a ramp for the slide out room 402. In the present disclosure, the wear bar and flashing cover are integrated into a single device which provides several advantages over the prior art.

In the embodiment of FIGS. 1-8, and 12 the base 102 connects to an archway 106. The archway 106 is generally parabolic in shape and comprises an upward ramp 104 and a downward ramp 112. The archway 106 further comprises a top and bottom surface and a first and second end. The first end of the archway 106 is proximate the connection between the base 102 and the upward ramp 104 and the second end of the archway 106 forms the end of the downward ramp 112. Between the upward ramp 104 and downward ramp 112 is the peak of the archway 106, which forms the most elevated point of the wear bar 100. In the preferred embodiment, the peak of the archway 106 is at a higher elevation than the RV sub floor 406.

The upward ramp 104 provides an incline which elevates above the sub floor 406. The upward ramp 104 is designed to engage with the RV slide out room 402 and move the RV slide out room 402 between the extended and retracted positions. The RV slide out room 402 may generally include a sloped edge, which complements the archway as a mechanism to move the RV slide out room 402 up and over the archway and above the RV sub floor 406. However, a sloped edge slide out room 402 is not required.

The downward ramp 112 provides a decline which guides the RV slide out room 402 to the top of the sub floor 406 in order to close the RV slide out room 402 in its retracted position. Conversely, in order to extend the slide out room 402, the downward ramp 112 provides an incline which allows the RV slide out room 402 to climb up and over the arced 106 portion and to the base of the wear bar 102. Proximate the second end of the archway 106—the lowest elevated portion of the downward ramp 112—is a mounting portion 128 to provide an ramp from (or to) the top of the sub floor 406, for the slide out room 402 to move between the retracted and extended positions.

The mounting portion 128 comprises a decline which generally maintains the curvature of the downward ramp 112. A first edge of the mounting portion 128 is connected to the incline portion 126 of the recessed channel 110. A second edge 132 of the mounting portion 128 forms the end of the downward ramp 112. A rib 130 extends from the mounting portion 128 in a downward direction vertically and perpendicular to the base 102. In the preferred embodiment, the rib 130 and edge 132 of the mounting portion 128 rest flush with the subfloor 406 when the wear bar 100 is installed in the RV.

The archway 106 of the wear bar 100 provides the means for the RV slide out room 402 to move between both the extended and retracted positions.

In an embodiment, the archway 106 is comprised of a plastic, plastic resin, metal (including but not limited to steel and aluminum), metal alloy, composite, wood, PVC, or combination thereof or other similarly situated materials. In an alternative embodiment the archway 106 is comprised of TPE 40D, TPE 65-75D, PP80-85R Rockwell, or PP Shore D 70-75 or a combination therewith.

The archway 106 comprises a length, width, thickness, and height from the horizontal plane extending from the base 102. In an embodiment, the archway 106 comprises a peak height of 1.02 inches from the horizontal plane extending from the base 102. In an alternative embodiment, the archway 106 comprises a peak height of 0.84 inches from the bottom of the base 102.

In an embodiment of the present disclosure, when the RV slide out room 402 is in its extended position, the sloped edge of the slide out room 402 mates with the upward ramp 104 of the archway 106 and the top of the slide out room 402 is at the same elevation as the RV sub floor 406. In some embodiments the top of the slide out room 402 is not configured to be the same elevation as the RV sub floor 406.

Alternative arrangements are considered for the archway 106. In an alternative embodiment, the archway 106 is a triangular configuration, defined by an angled wall. The angled wall comprised of a first and second end, the first end connected to the base 102 of the wear bar and the second end including a mounting means to provide a connection or offramp to the RV sub floor 406. The considered mounting means include and such means known to those of skill in the art.

In the embodiment of FIGS. 1-8, the bottom surface of the archway 106 include a series of ribs 108 which generally protrude in a downward direction vertically and perpendicular to the base 102. The series of ribs 108 comprise at least one rib and vary in length. In an embodiment, at least one rib 116a, 116b extends from the bottom surface of the archway 106 to a position proximate the horizontal plane extending from the base 102, at least one rib 118 extends partially in the direction of the horizontal plan extending from the base 102, and at least one rib 120 extends proximate the horizontal plane extending from the end of the downward ramp 112. The engagement of the ribs 108 increases the load bearing capability of the integrated wear bar and allows for installation of the wear bar on various profiles.

In the preferred embodiment, at least one rib 116a, 116b extends to contact the RV frame 404 and another rib 120 extends to engage with the RV sub floor 406.

In an embodiment, the ribs 108 are comprised of a plastic, plastic resin, metal (including but not limited to steel and aluminum), metal alloy, composite, wood, PVC, or combination thereof or other similarly situated materials. In an alternative embodiment the ribs 108 are comprised of TPE 40D, TPE 65-75D, PP80-85R Rockwell, or PP Shore D 70-75 or a combination therewith.

The ribs 108 comprise a length, width, and thickness. In an embodiment, the ribs 108 comprise a thickness of 0.10 inches. In an alternative embodiment, the wear bar 100 comprises four ribs. In the alternative embodiment, two of the ribs 116a, 116b extend proximate (or to contact) the RV frame 404. A third rib 118 extends a portion of the distance to the RV frame 404, parallel with the other ribs 108. A fourth rib 120 extends to engage with the surface of the sub floor 406. In alternative embodiments, the wear bar 100 comprises any arrangement of three ribs.

In the present disclosure, the archway 106 and the ribs 108 perform a similar role to that of a standard wear bar. However, the present disclosure improves upon the prior art by combining the flashing cover and wear bar into a single device. In addition, the integration of the ribs 108 in combination with the consolidation of the flashing cover and wear bar increases the load bearing capability, making the disclosed device sturdier and more effective.

In an embodiment, the downward ramp 112 comprises a recessed channel 110 which enables the installation of the part in various locations. The recessed channel 110 extends along the width of the integrated wear bar 100 and comprises an accelerated downward slope 122, a flat base 124 portion, and a sharp incline 126 portion which maintains the curvature of the downward ramp 112. The recessed channel 110 enables the installer to fasten the integrated wear bar 100 in various locations directly to the sub floor 406, providing flexibility for securing the new component, decreasing installation time, and improving repeatability of fastening operations.

In an embodiment, the recessed channel is comprised of a plastic, plastic resin, metal (including but not limited to steel and aluminum), metal alloy, composite, wood, PVC, or combination thereof or other similarly situated materials. In an alternative embodiment the base 102 is comprised of TPE 40D, TPE 65-75D, PP80-85R Rockwell, or PP Shore D 70-75 or a combination therewith.

In an embodiment, the recessed channel 110 comprises a channel sized to match the width of a fastening device which may be used to attach the wear bar 100 to the sub floor 406. In an embodiment, the channel extends the width of the wear bar 100.

The recessed channel 110 of the present disclosure provides for an improvement upon the art as it enables the installer to fasten the integrated wear bar 100 in various locations directly to the sub floor 406, providing flexibility for securing the device, decreasing installation time, and improving repeatability of fastening operations.

In an embodiment of the present disclosure, the components of the integrated wear bar 100 identified above are molded from a single piece of material comprising a plastic, plastic resin, metal (including but not limited to steel and aluminum), metal alloy, composite, wood, PVC, or combination thereof or other similarly situated materials.

Second Embodiment

Figure 9:
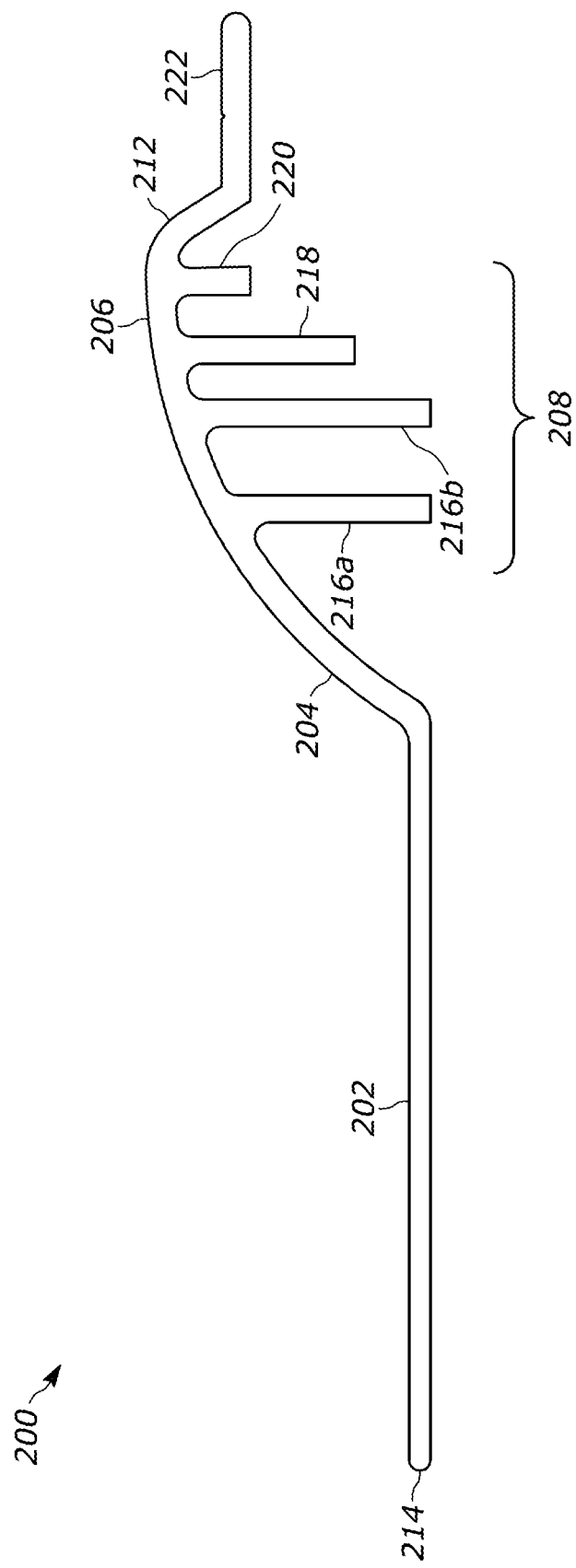
FIG. 9 is a side view of a second embodiment of the integrated wear bar.

FIG. 9 shows a second embodiment of an integrated wear bar 200 in accordance with the present disclosure. Except as otherwise noted herein, like reference numbers (e.g., elements 102 and 202) are used to identify like components. The integrated wear bar 200 comprises a base 202, an upward ramp 204, and archway 206, a series of ribs 208, a downward ramp 212, and a horizontal end piece 222.

In the embodiment of FIG. 9, the base 202 is comprised of a length, width, and thickness of material sized to guide the movement of a slide out room 402. The base 202 comprises two ends, a first end 214 and a second end, wherein the first end 214 is open and the second end is connected to the upward ramp 204. The base 202 is substantially flat and provides a smooth surface for the slide out floor 402 to move along. Additionally, the horizontal end piece 222 is comprised of a length, width, and thickness of material sized to guide the movement of a slide out room 402.

The base 202 connects to an archway 206, wherein the archway 206 comprises an upward ramp 204 and a downward ramp 212. The upward ramp 204 provides an incline which elevates above the sub floor 406. The upward ramp 204 is designed to engage with the RV slide out room 402, which typically includes a sloped edge, as a mechanism for the RV slide out room 402, to climb up and over the sub floor 406. The downward ramp 212 and horizontal end portion 222 provide a guide for the RV slide out room 402 to the top of the sub floor 406 in order to store the RV slide out room 402 in its closed position. In order to extend the slide out room 402, the downward ramp 212 and horizontal end portion 222 provide an incline which allows the RV slide out room 402 to climb up and over the arced 206 portion into the extended position. The archway 206 of the integrated wear bar allows the RV slide out room 402 to climb up and over the sub floor 406 into both extended and retracted positions.

In the embodiment of FIG. 9, the archway 206 of the wear bar 200 include a series of ribs 208 which protrude vertically from the bottom surface of the archway 206 toward the horizontal plane extending from the base 202. The series of ribs 208 comprise at four ribs which vary in length. In the embodiment of FIG. 9, two ribs 216a, 216b extend to a position proximate (or contacting) the frame 404, one rib 218 extends partially in the same direction, and one rib 220 extends to engage with the sub floor 406. The engagement of the ribs 208 increases the load bearing capability of the integrated wear bar 200.

Figure 10:
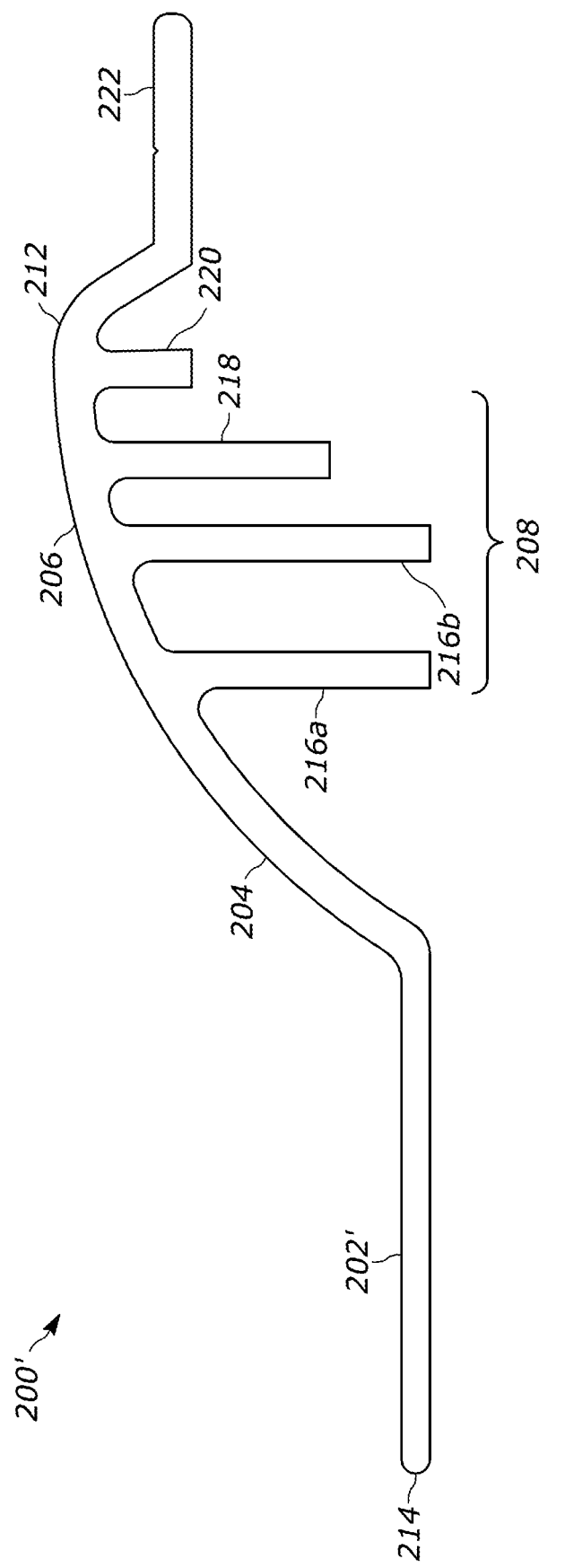
FIG. 10 is a side view of the second embodiment of the integrated wear bar comprising different dimensions.

FIG. 10 depicts a second embodiment of the wear bar 200' shown in FIG. 9. The wear bar 200' is identical to the wear bar 200 of FIG. 9 except for the base 202' which is shorter in length than the base 202 of FIG. 9.

Third Embodiment

Figure 11:
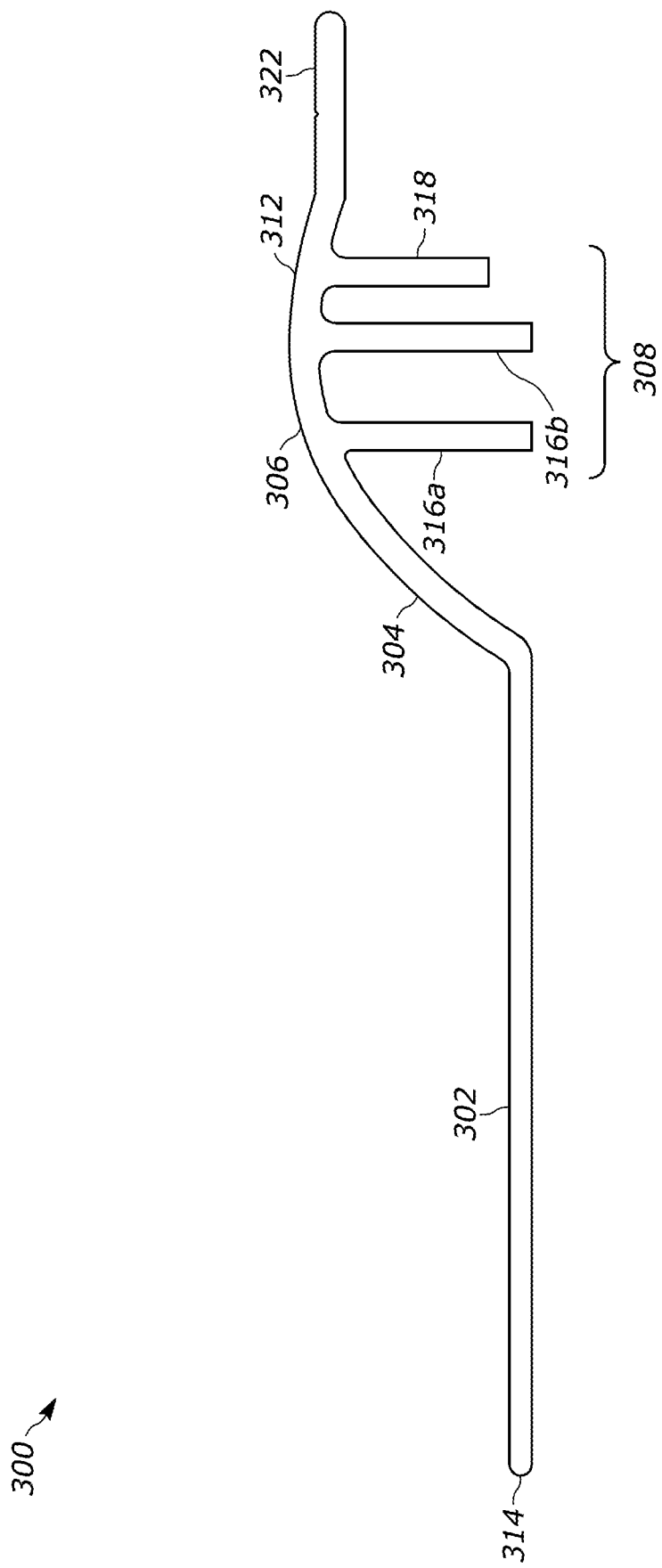
FIG. 11 is a side view of a third embodiment of the integrated wear bar.

FIG. 11 shows a side view of a third embodiment of the integrated wear bar 300 in accordance with the present disclosure. Except as otherwise noted herein, like reference numbers (e.g., elements 102, 202, and 302) are used to identify like components.

The integrated wear bar 300 comprises a base 302, an upward ramp 304, and archway 306, a series of ribs 308, a downward ramp 312, and a horizontal end piece 322.

In the embodiment of FIG. 11, the base 302 is comprised of a length, width, and thickness of material sized to guide the movement of a slide out room 402. The base 302 comprises two ends, a first end 314 and a second end, wherein the first end 314 is open and the second end is connected to the upward ramp 304. The base 302 is substantially flat and provides a smooth surface for the slide out floor 402 to move along. Additionally, the horizontal end piece 322 is comprised of a length, width, and thickness of material sized to guide the movement of a slide out room 402.

The base 302 connects to an archway 306, wherein the archway 306 comprises an upward ramp 304 and a downward ramp 312. The upward ramp 304 provides an incline which elevates above the sub floor 406. The upward ramp 304 is designed to engage with the RV slide out room 402, which typically includes a sloped edge, as a mechanism for the RV slide out room 402, to climb up and over the sub floor 406. The downward ramp 312 and horizontal end portion 322 provide a guide for the RV slide out room 402 to the top of the sub floor 406 in order to store the RV slide out room 402 in its closed position. In order to extend the slide out room 402, the downward ramp 312 and horizontal end portion 322 provide an incline which allows the RV slide out room 402 to climb up and over the arced 306 portion into the extended position. The archway 306 of the integrated wear bar allows the RV slide out room 402 to climb up and over the sub floor 406 into both extended and retracted positions.

In the embodiment of FIG. 11, the archway 306 of the wear bar 300 include a series of ribs 308 which protrude vertically from the bottom surface of the archway 306 toward the horizontal plane extending from the base 302. The series of ribs 308 comprise three ribs which vary in length. In the embodiment of FIG. 11, two ribs 316a, 316b extend to a position proximate (or contacting) the frame 404, one rib 318 extends partially in the same direction. The engagement of the ribs 308 increases the load bearing capability of the integrated wear bar 300.

Operation of the Wear Bar

Figure 12:
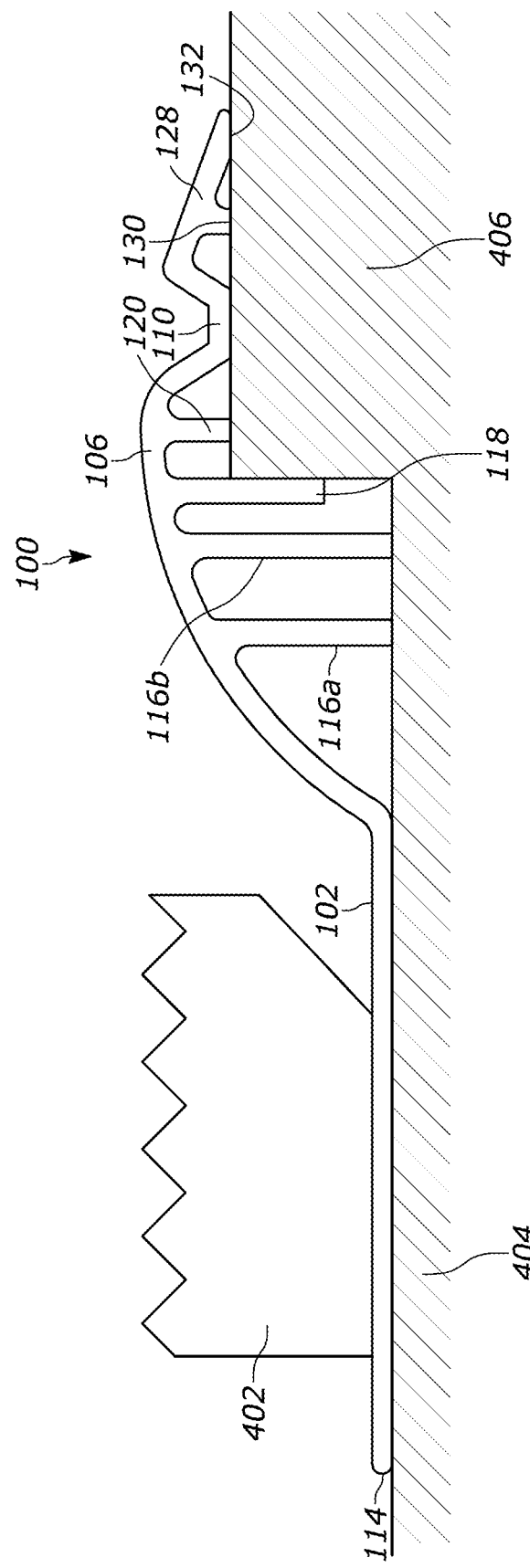
FIG. 12 is a side view of the integrated wear bar of FIG. 1 used in connection with an RV slide out room.

FIG. 12 shows a side view of the first embodiment of the integrated wear bar 100 installed in an RV slide out room system. The RV slide out room system comprises a slide out room 402, a frame 404 and a subfloor 406 (each of which are described above).

An RV slide out room 402 is in its extended position when it is resting alongside the sub floor 406. The base of the RV slide out room 402 has a first bottom portion which is flat and runs along a horizontal axis. The RV slide out room 402 contains an sloped second bottom portion which forms an angle between the horizontal axis of the first bottom portion of the slide out room 402 and the second bottom portion.

To use the integrated wear bar 100, a user places the wear bar 100 such that the base 102 is flush with the frame 404 of the RV and the edge 132 of the mounting portion 128 and its corresponding rib 130 (or, in the case of integrated wear bar 200, 300, the horizontal end portion 222, 322) rests upon the sub floor 406. In an embodiment, two ribs 116a, 116b are in contact with the frame 404, a third rib 118 is in contact with the side of the sub floor 406 and a fourth rib 120 is in contact with the top of the sub floor 406.

Next, a user applies force to the RV slide out room 402 in the direction of the sub floor 406. The force moves the RV slide out room 402 along the base 102 until the sloped second bottom portion makes contact with the upward ramp 104. The user continues to apply force to move the RV slide out room 402 up the upward ramp 104 and over the sub floor 406 into a stored position.

The RV slide out room 402 may be moved into the extended position by applying force in the opposite direction.

Other embodiments of the wear bar 200, 200', and 300 may be installed and used in a similar fashion.

The foregoing examples have been provided merely for the purpose of explanation, and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. Certainly, one skilled in the field would be able to conceive of a wide variety of alternative configurations and successful combinations thereof. The selection of these and other details of construction are believed to be well within the ability of one of even rudimentary skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the invention may be incorporated in other structural forms without departing from the spirit and scope of the invention. The invention encompasses embodiments both comprising and consisting of the elements described with reference to the illustrative embodiments. All technical terms shall take on their customary meaning as established by the appropriate technical discipline utilized by those normally skilled in that particular area.

What is claimed is:

1. An integrated wear bar comprising:
a smooth base, the base comprising a first end and a second end, wherein the first end is open;
an archway connected to the second end of the base, wherein the archway is comprised of an upward and downward ramp;
the upward ramp extending in a generally arced and upward direction from the base to a peak of the archway;
the downward ramp extending in a generally arced and downward direction from the peak of the archway to a generally horizontal end portion, the end portion having an elevation above the base and below the peak of the archway; and
a series of ribs extending in a downward direction from the bottom of the archway, wherein the series of ribs comprises at least one rib, wherein at least one rib extends from the bottom of the archway.

2. The integrated wear bar of claim 1, wherein the downward ramp further comprises a recessed channel, the recessed channel comprising a downward slope, a flat base portion, and an incline portion.

3. The integrated wear bar of claim 2, wherein the recessed channel is comprised of a plastic, plastic resin, metal, metal alloy, composite, wood, and/or PVC.

4. The integrated wear bar of claim 3, wherein the length of the recessed channel is sized to the width of a fastening device.

5. The integrated wear bar of claim 1, wherein the integrated wear bar is comprised of a plastic, plastic resin, metal, metal alloy, composite, wood, and/or PVC.

6. The integrated wear bar of claim 1, wherein the series of ribs comprises:
a first rib and second rib, the first rib and second rib spaced apart and extending in a generally downward direction from the upward ramp to a position proximate the horizontal plane extending from the base; and
a third rib spaced apart from the first rib and second rib and extending in a generally downward direction.

7. The integrated wear bar of claim 6, wherein the series of ribs further comprises:
a fourth rib spaced apart from the third rib and extending in a generally downward direction from a position proximate the peak of the archway to a position proximate the horizontal plane of the end portion.

8. The integrated wear bar of claim 1, wherein the integrated wear bar comprises a length of between 4 and 6 inches from end to end.

9. The integrated wear bar of claim 1, wherein the integrated wear bar comprises a peak height of between 0.5 inches to 1.5 inches.

10. The integrated wear bar of claim 1, wherein the integrated wear bar is molded from a single piece of material.

11. A method of closing a slide out room in a recreational vehicle with an integrated wear bar, comprising the steps of:
placing the base of the integrated wear bar flush with the frame of a recreational vehicle and the end portion of the downward ramp on an elevated sub floor portion of a recreational vehicle;
applying force to a slide out room in the direction of the integrated wear bar; and
moving the slide out room along the base and up the ramp of the integrated wear bar into a stored position.

12. The method of claim 11 further comprising the step of aligning the series of ribs along the floor of a recreational vehicle, a first rib and second rib placed in contact with the frame of a recreational vehicle, a third rib placed in contact with the side of the elevated subfloor floor portion, and a fourth rib placed in contact with the top of an elevated sub floor portion.

* * * * *